(12) United States Patent
Davis et al.

(10) Patent No.: US 9,908,446 B2
(45) Date of Patent: Mar. 6, 2018

(54) ELECTRIC MOTOR ASSEMBLY FOR A SEAT LOCKING MECHANISM

(71) Applicant: GOODRICH CORPORATION, Charlotte, NC (US)

(72) Inventors: Kenneth J. Davis, Menominee, MI (US); Patrick Emmett Hyde, Peshtigo, WI (US); Scott H. Tedtman, Pound, WI (US)

(73) Assignee: GOODRICH CORPORATION, Charlotte, NC (US)

( * ) Notice: Subject to any disclaimer, the term of this patent is extended or adjusted under 35 U.S.C. 154(b) by 119 days.

(21) Appl. No.: 15/130,276

(22) Filed: Apr. 15, 2016

(65) Prior Publication Data
US 2017/0297462 A1 Oct. 19, 2017

(51) Int. Cl.
*B64D 11/06* (2006.01)
*B60N 2/44* (2006.01)

(52) U.S. Cl.
CPC ............ *B60N 2/443* (2013.01); *B64D 11/064* (2014.12); *B60N 2002/4425* (2013.01)

(58) Field of Classification Search
CPC ........ B60N 2/44; B60N 2/442; B60N 2/4425; B60N 2/443; B60N 2/4435; B60N 2/444;
(Continued)

(56) References Cited

U.S. PATENT DOCUMENTS

| | | | |
|---|---|---|---|
| 3,622,202 | A | 11/1971 | Brown |
| 4,284,935 | A | 8/1981 | March et al. |
| 4,756,502 | A | 7/1988 | Egan |
| 4,842,234 | A | 6/1989 | Koch |
| 5,161,765 | A | 11/1992 | Wilson |
| 6,691,970 | B1 * | 2/2004 | Sutton, Sr. ............. B60N 2/062 248/425 |

(Continued)

FOREIGN PATENT DOCUMENTS

| | | |
|---|---|---|
| DE | 3444483 A1 | 6/1986 |
| EP | 1900566 A2 | 3/2008 |

(Continued)

OTHER PUBLICATIONS

Non Final Office Action for U.S. Appl. No. 15/130,243, dated Apr. 12, 2017, 7pgs.

(Continued)

*Primary Examiner* — Adam D Rogers
(74) *Attorney, Agent, or Firm* — Cantor Colburn LLP

(57) ABSTRACT

A seat locking mechanism comprises a plurality of positional brake mechanisms including a longitudinal brake assembly, a lateral brake assembly, and a rotational brake assembly; and an electric motor assembly operably connected to each of the plurality of positional brake mechanisms. The electric motor assembly comprises: a drive motor; a clutch system located between the drive motor and the plurality of positional brake mechanisms; and a solenoid operably connected to the clutch system. The solenoid in operation engages the clutch system to operably connect the electric motor to the plurality of positional brake mechanisms when the electric motor assembly is activated and disengages the clutch system to operably disconnect the electric motor to the plurality of positional brake mechanisms when the electric motor assembly is deactivated. The electric motor assembly in operation moves the plurality of positional brake mechanisms to at least one of a locked position and unlocked position.

20 Claims, 9 Drawing Sheets

(58) Field of Classification Search
CPC .............. B60N 2002/4425; B60N 2/08; B60N 2/0831; B60N 2/0837; B60N 2/0843; B60N 2/085; B60N 2/0856; B60N 2/0881; B60N 2/0887; B60N 2002/4455; B64D 11/064; A47C 9/00; A47C 25/00
See application file for complete search history.

(56) References Cited

U.S. PATENT DOCUMENTS

| | | | |
|---|---|---|---|
| 6,938,957 B2 * | 9/2005 | Beatty .................. | B60N 2/06 248/425 |
| 7,108,325 B2 | 9/2006 | Williamson | |
| 7,748,778 B1 | 7/2010 | Udriste | |
| 7,775,595 B2 | 8/2010 | McMillen | |
| 8,109,577 B2 | 2/2012 | Shao | |
| 8,931,847 B2 | 1/2015 | Cailleteau | |
| 9,180,792 B2 * | 11/2015 | Haller .................. | B60N 2/508 |
| 9,493,242 B2 * | 11/2016 | Oleson .................. | B64D 11/06 |
| 9,663,001 B2 * | 5/2017 | Haller .................. | B60N 2/146 |
| 9,751,435 B1 * | 9/2017 | Davis .................. | B60N 2/443 |
| 2006/0108848 A1 | 5/2006 | Williamson et al. | |
| 2009/0114793 A1 | 5/2009 | Brewer et al. | |
| 2013/0009435 A1 | 1/2013 | Westerink et al. | |
| 2013/0161990 A1 | 6/2013 | Oleson | |
| 2014/0159436 A1 | 6/2014 | Iacobucci | |
| 2017/0297461 A1 * | 10/2017 | Davis .................. | B60N 2/443 |
| 2017/0297720 A1 * | 10/2017 | Davis .............. | B64D 11/06395 |
| 2017/0297721 A1 * | 10/2017 | Davis .............. | B64D 11/06395 |

FOREIGN PATENT DOCUMENTS

| | | |
|---|---|---|
| GB | 799702 A | 8/1958 |
| JP | S58191637 A | 11/1983 |
| WO | 2013035533 A1 | 3/2013 |
| WO | 2015066683 A1 | 5/2015 |

OTHER PUBLICATIONS

Notice of Allowance for U.S. Appl. No. 15/130,291, dated Apr. 18, 2017, 9pgs.

Extended European Search Report for Application No. 17166471. 1-1754 dated Aug. 7, 2017; Date of Search Received Aug. 18, 2017; 6 pages.

Extended European Search Report for Application No. 17166450. 1-1754 dated Aug. 23, 2017; Date of Search Received Sep. 1, 2017; 7 pages.

Extended European Search Report for Application No. 17166467. 5-1754 dated Aug. 30, 2017; Date of Search Received Sep. 13, 2017; 8 pages.

Extended European Search Report for Application No. 17166470. 9-1754 dated Aug. 30, 2017; Date of Search Received Sep. 13, 2017; 7 pages.

Extended European Search Report for Application No. 17166573. 0-1754 dated Sep. 6, 2017; Date of Search Received Sep. 13, 2017; 8 pages.

* cited by examiner

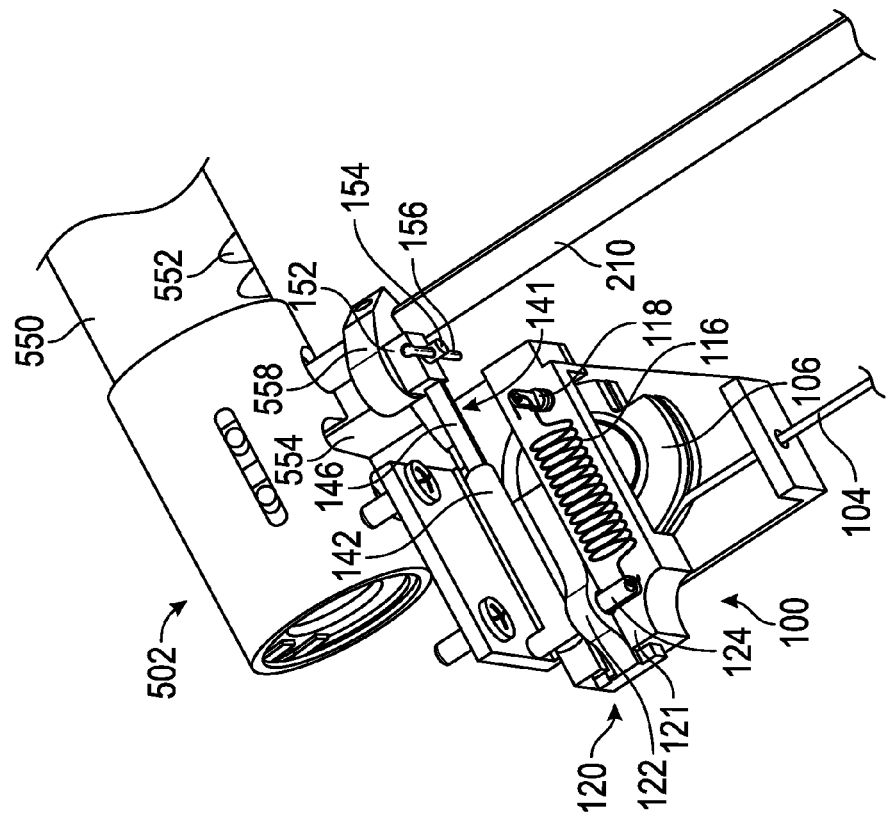
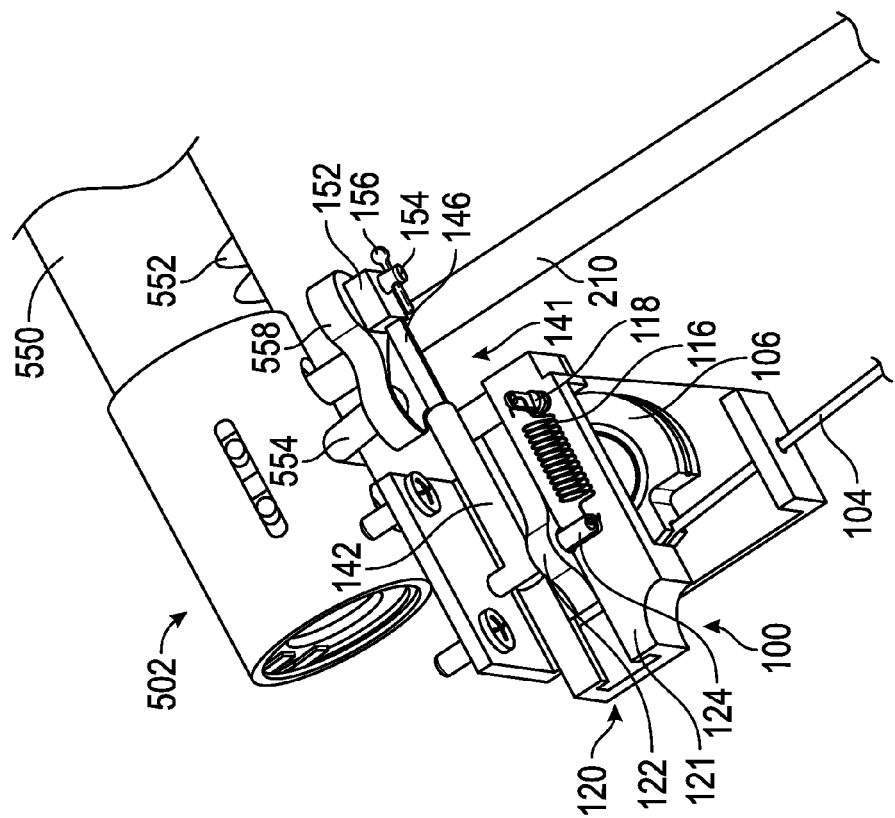

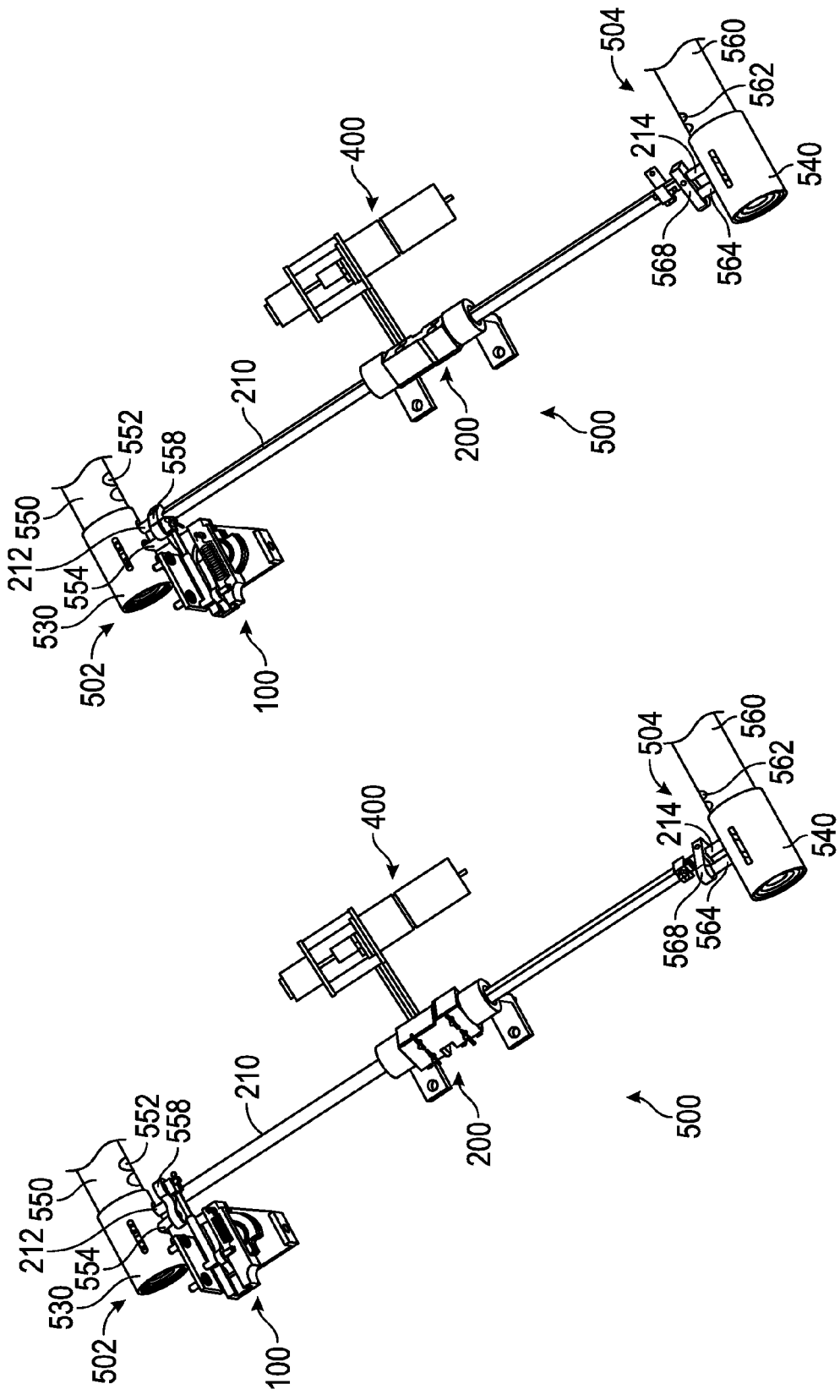

ELECTRIC MOTOR ASSEMBLY FOR A SEAT LOCKING MECHANISM

BACKGROUND

The subject matter disclosed herein generally relates to aircraft interiors, and more particularly to locking mechanism for aircraft seats.

Adjustable seats are commonly used on modern aircraft to permit the user to move a seat in several directions. For example, some seats permit a user to translate the seat forward, aft and laterally, while also permitting the user to rotate the seat around a central axis. For each of these seat movements, many different locking mechanisms have been used to control seat positioning. Some adjustable seats have required an abundance of cables, often exceeding 10 cables, to engage and disengage multiple locking mechanisms. Accordingly, a locking mechanism capable of adjusting a seat in multiple directions while minimizing the part count would bring cost, weight, and reliability benefits.

SUMMARY

According to one embodiment, a seat locking mechanism is provided. The seat locking mechanism comprises a plurality of positional brake mechanisms including a longitudinal brake assembly, a lateral brake assembly, and a rotational brake assembly; and an electric motor assembly operably connected to each of the plurality of positional brake mechanisms. The electric motor assembly comprises: a drive motor; a clutch system located between the drive motor and the plurality of positional brake mechanisms; and a solenoid operably connected to the clutch system. The solenoid in operation engages the clutch system to operably connect the electric motor to the plurality of positional brake mechanisms when the electric motor assembly is activated and disengages the clutch system to operably disconnect the electric motor to the plurality of positional brake mechanisms when the electric motor assembly is deactivated. The electric motor assembly in operation moves the plurality of positional brake mechanisms to at least one of a locked position when the electric motor assembly is activated and an unlocked position when the electrical motor assembly is deactivated.

In addition to one or more of the features described above, or as an alternative, further embodiments of the seat locking mechanism may include that the clutch system further comprises: a male clutch and a female clutch. The male clutch in operation engages the female clutch when the electric motor assembly is activated and disengages the female clutch when the electric motor assembly is deactivated. At least one of the male clutch and the female clutch is operably connected to the motor and the other is operably connected to the solenoid.

In addition to one or more of the features described above, or as an alternative, further embodiments of the seat locking mechanism may include a carriage assembly operably connecting the electric motor assembly to the plurality of positional brake mechanisms. The carriage assembly in operation moves the plurality of positional brake mechanisms to at least one of a locked position when the electric motor assembly is activated and an unlocked position when the electrical motor assembly is deactivated.

In addition to one or more of the features described above, or as an alternative, further embodiments of the seat locking mechanism may include that the carriage assembly has a first end and a second end. The first end being operably connected to a first lateral brake of the lateral brake assembly and the second end being operably connected to a second lateral brake of the lateral brake assembly.

In addition to one or more of the features described above, or as an alternative, further embodiments of the seat locking mechanism may include that the carriage assembly is operably connected to the longitudinal brake assembly through a longitudinal brake cable.

In addition to one or more of the features described above, or as an alternative, further embodiments of the seat locking mechanism may include that the carriage assembly is operably connected to the rotational brake assembly through a rotational brake cable.

In addition to one or more of the features described above, or as an alternative, further embodiments of the seat locking mechanism may include a damper operably connected to the electric motor assembly. The damper in operation dampens the motion of the electric motor assembly.

According to another embodiment, a method of assembling a seat locking mechanism is provided. The method of assembling a seat locking mechanism comprises: installing a plurality of positional brake mechanisms onto a structural support. The plurality of positional brake mechanisms including a longitudinal brake assembly, a lateral brake assembly, and a rotational brake assembly. The method of assembling a seat locking mechanism also comprises: installing an electric motor assembly onto the structural support; and operably connecting the electric motor assembly to each of the plurality of positional brake mechanisms. The electric motor assembly comprises: a drive motor; a clutch system located between the drive motor and the plurality of positional brake mechanisms; and a solenoid operably connected to the clutch system. The solenoid in operation engages the clutch system to operably connect the electric motor to the plurality of positional brake mechanisms when the electric motor assembly is activated and disengages the clutch system to operably disconnect the electric motor to the plurality of positional brake mechanisms when the electric motor assembly is deactivated. The electric motor assembly in operation moves the plurality of positional brake mechanisms to at least one of a locked position when the electric motor assembly is activated and an unlocked position when the electrical motor assembly is deactivated.

In addition to one or more of the features described above, or as an alternative, further embodiments of the method of assembling a seat locking mechanism include that the clutch assembly further comprises: a male clutch and a female clutch. The male clutch in operation engages the female clutch when the electric motor assembly is activated and disengages the female clutch when the electric motor assembly is deactivated. At least one of the male clutch and the female clutch is operably connected to the motor and the other is operably connected to the solenoid.

In addition to one or more of the features described above, or as an alternative, further embodiments of the method of assembling a seat locking mechanism include operably connecting the electric motor assembly to the plurality of positional brake mechanisms through a carriage assembly. The carriage assembly in operation moves the plurality of positional brake mechanisms to at least one of a locked position when the electric motor assembly is activated and an unlocked position when the electrical motor assembly is deactivated.

In addition to one or more of the features described above, or as an alternative, further embodiments of the method of assembling a seat locking mechanism include operably connecting the carriage assembly to the lateral brake assembly. The carriage assembly having a first end and a second end. The first end being operably connected to a first lateral brake of the lateral brake assembly and the second end being operably connected to a second lateral brake of the lateral brake assembly.

In addition to one or more of the features described above, or as an alternative, further embodiments of the method of assembling a seat locking mechanism include operably connecting the carriage assembly to the longitudinal brake assembly through a longitudinal brake cable.

In addition to one or more of the features described above, or as an alternative, further embodiments of the method of assembling a seat locking mechanism include operably connecting the carriage assembly to the rotational brake assembly through a rotational brake cable.

In addition to one or more of the features described above, or as an alternative, further embodiments of the method of assembling a seat locking mechanism include operably connecting a damper to the electric motor assembly. The damper in operation dampens the motion of the electric motor assembly.

According to another embodiment, a method of operating a seat locking mechanism is provided. The method of operating a seat locking mechanism comprises: operating a plurality of positional brake mechanisms including a longitudinal brake assembly, a lateral brake assembly, and a rotational brake assembly. The operating includes moving each of the plurality of positional brake mechanisms to at least one of a locked position and an unlocked position. The method of operating a seat locking mechanism also comprises: controlling, using an electric motor assembly, each of the plurality of positional brake mechanisms. The electric motor assembly comprises: a drive motor; a clutch system located between the drive motor and the plurality of positional brake mechanisms; and a solenoid operably connected to the clutch system. The solenoid in operation engages the clutch system to operably connect the electric motor to the plurality of positional brake mechanisms when the electric motor assembly is activated and disengages the clutch system to operably disconnect the electric motor to the plurality of positional brake mechanisms when the electric motor assembly is deactivated. The electric motor assembly in operation moves the plurality of positional brake mechanisms to at least one of a locked position when the electric motor assembly is activated and an unlocked position when the electrical motor assembly is deactivated.

In addition to one or more of the features described above, or as an alternative, further embodiments of the method of operating a seat locking mechanism may include moving, using a plurality of biasing mechanisms, each of the plurality of positional brake mechanisms to the locked position, when the electric motor assembly is deactivated.

In addition to one or more of the features described above, or as an alternative, further embodiments of the method of operating a seat locking mechanism may include that the clutch system further comprises: a male clutch and a female clutch. The male clutch in operation engages the female clutch when the electric motor assembly is activated and disengages the female clutch when the electric motor assembly is deactivated. At least one of the male clutch and the female clutch is operably connected to the motor and the other is operably connected to the solenoid.

In addition to one or more of the features described above, or as an alternative, further embodiments of the method of operating a seat locking mechanism may include moving, using a carriage assembly, each of the plurality of positional brake mechanisms. The electric motor assembly is operably connected to each of the plurality of positional brake mechanisms through the carriage assembly.

In addition to one or more of the features described above, or as an alternative, further embodiments of the method of operating a seat locking mechanism may include that the carriage assembly has a first end and a second end. The first end being operably connected to a first lateral brake of the lateral brake assembly and the second end being operably connected to a second lateral brake of the lateral brake assembly.

In addition to one or more of the features described above, or as an alternative, further embodiments of the method of operating a seat locking mechanism may include that the carriage assembly is operably connected to the rotational brake assembly through a rotational brake cable.

Technical effects of embodiments of the present disclosure include a locking mechanism to allow seat adjustment in forward, aft, lateral and rotational directions while minimizing the part count and/or weight of the locking mechanism.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

FIG. 4 is a schematic illustration of an override bypass assembly of a seat locking mechanism in a locked position, according to embodiments of the present disclosure;

FIG. 5 is a schematic illustration of an override bypass assembly of a seat locking mechanism in an unlocked position, according to embodiments of the present disclosure;

FIG. 10 is a schematic illustration of a lateral brake assembly in a locked position, according to embodiments of the present disclosure; and FIG. 11 is a schematic illustration of a lateral brake assembly in an unlocked position, according to embodiments of the present disclosure.

The detailed description explains embodiments of the present disclosure, together with advantages and features, by way of example with reference to the drawings.

DETAILED DESCRIPTION

Figure 1:
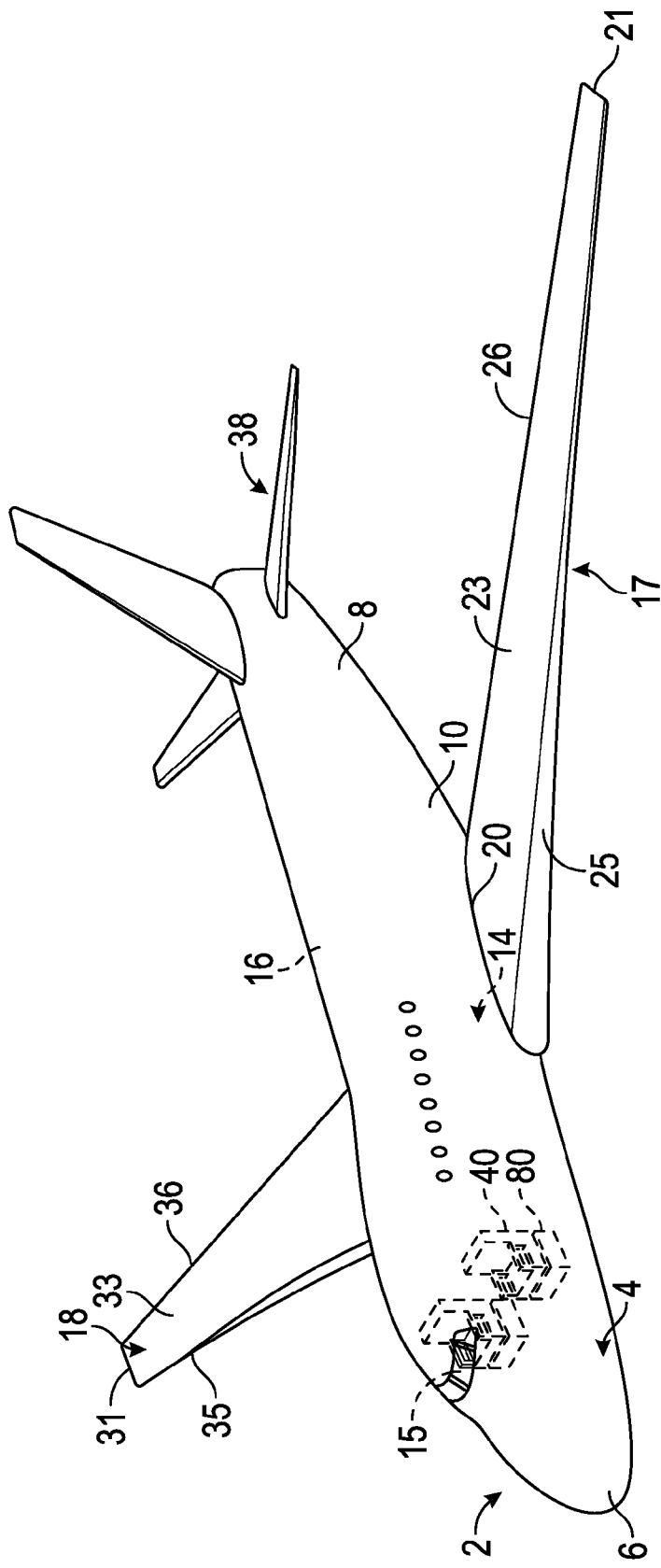
FIG. 1 is a perspective view of an aircraft that may incorporate embodiments of the present disclosure.

Referring now to FIG. 1, which shows a perspective view of an aircraft 2 that may incorporate embodiments of the present disclosure. Aircraft 2 includes a fuselage 4 extending from a nose portion 6 to a tail portion 8 through a body portion 10. Body portion 10 houses an aircraft cabin 14 that includes a crew compartment 15 and a passenger compartment 16. Body portion 10 supports a first wing 17 and a second wing 18. First wing 17 extends from a first root portion 20 to a first tip portion 21 through a first airfoil portion 23. First airfoil portion 23 includes a leading edge 25 and a trailing edge 26. Second wing 18 extends from a second root portion (not shown) to a second tip portion 31 through a second airfoil portion 33. Second airfoil portion 33 includes a leading edge 35 and a trailing edge 36. Tail portion 8 includes a stabilizer 38. Aircraft 2 includes an adjustable seat 40 in the crew compartment 15 of the aircraft. In an embodiment, the adjustable seat 40 includes a seat locking mechanism 80 operably connected to the bottom of the adjustable seat 40. The adjustable seat 40 may also be mounted within the passenger compartment 16. As will be appreciated by those of skill in the art, the adjustable seat 40 may also be mounted within a building and/or within various types of vehicles including but not limited to automotive, aerospace, navel, locomotive, and railway.

Figure 2:
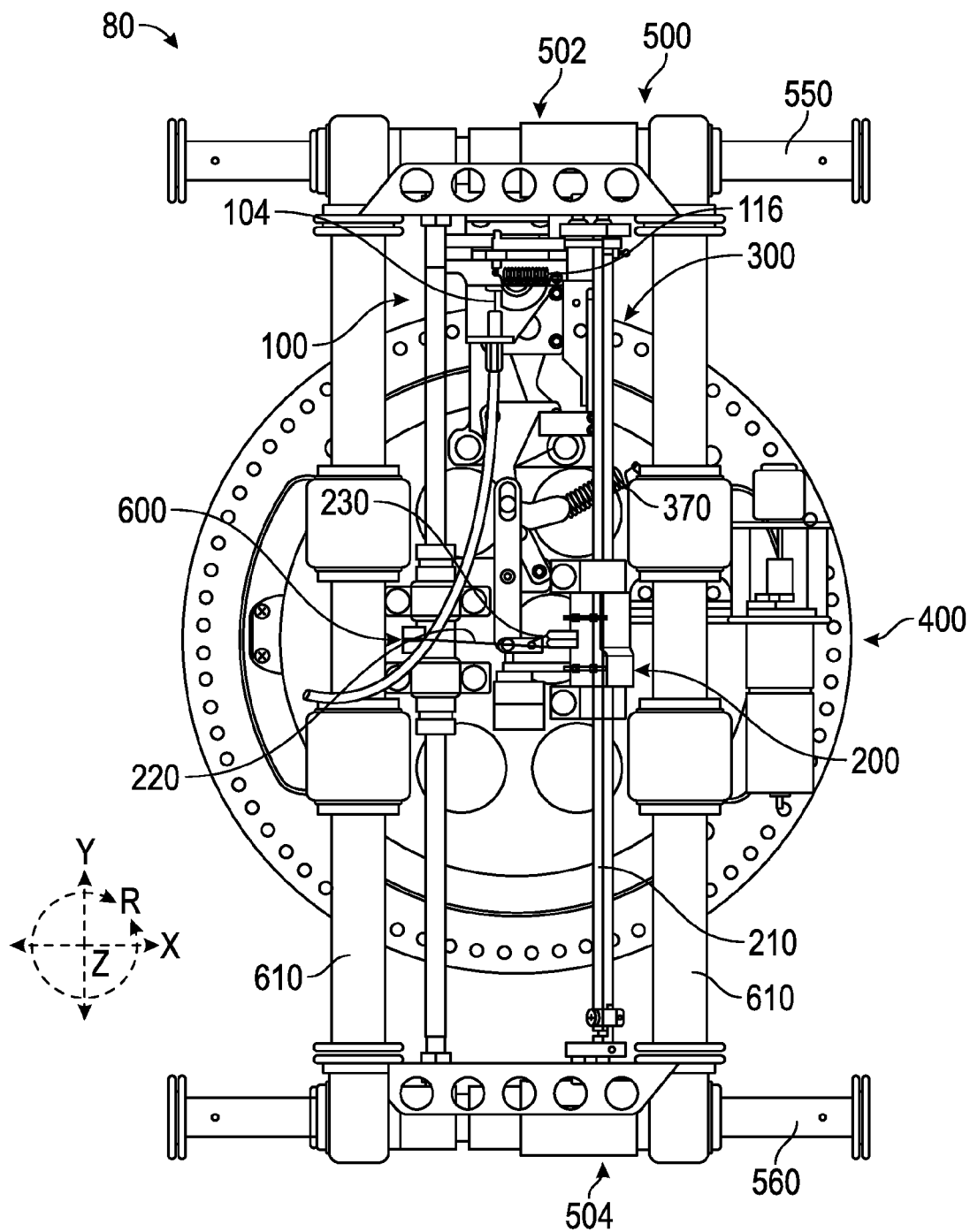
FIG. 2 is a schematic illustration of a seat locking mechanism in a locked position, according to embodiments of the present disclosure.
Figure 3:
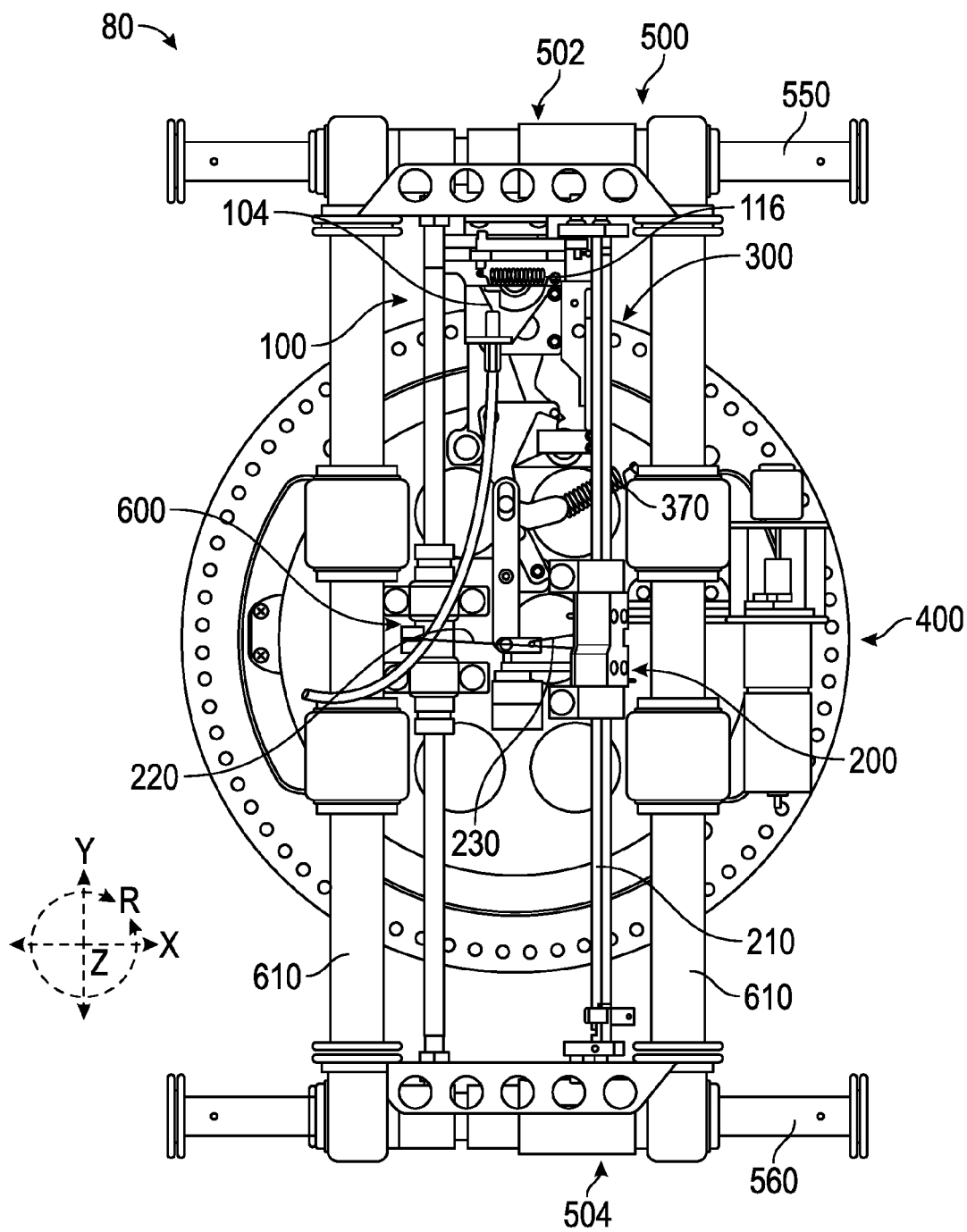
FIG. 3 is a schematic illustration of a seat locking mechanism in an unlocked position, according to embodiments of the present disclosure.

Referring now to FIGS. 2 and 3, FIG. 2 displays a schematic illustration of the seat locking mechanism 80 in a locked position, according to embodiments of the present disclosure; and FIG. 3 displays is a schematic illustration of the seat locking mechanism 80 in an unlocked position, according to embodiments of the present disclosure. The seat locking mechanism 80 includes an override bypass assembly 100, a carriage assembly 200, a rotational brake assembly 300, an electric motor assembly 400, a lateral brake assembly 500 and a longitudinal brake assembly 600. The longitudinal brake assembly 600 controls movement of the adjustable in the longitudinal Y direction (forward and aft) relative to the adjustable seat. In certain instances the forward and aft directions may be reversed depending on the orientation of the seat and/or may be referred to using different terminology such as, for example first and second. Likewise components of the seat locking mechanism described with the forward and aft terminology may also use the reverse terminology in certain instances and/or may be referred to using different terminology such as, for example a first and second. The lateral brake assembly 500 controls movement of the adjustable seat in the lateral X direction (left and right) relative to the adjustable seat. As will be appreciated by those of skill in the art, the orientation of the longitudinal Y and lateral X coordinate frame of the adjustable seat relative to an outside reference frame may vary based on a rotational R position of the adjustable seat. The rotational brake assembly 300 controls movement of the adjustable seat in the rotational R direction around an axis Z. As seen in FIGS. 2 and 3, axis Z may be perpendicular to both the longitudinal Y and lateral X direction. The longitudinal brake assembly 600, the lateral brake assembly 500, and the rotational brake assembly 300 may be referred to as positional brake mechanisms. The seat locking mechanism 80 may be controlled manually by applying tension to a cable 104 through the override bypass assembly 100 and/or automatically utilizing the electric motor assembly 400. The override bypass assembly 100 and the electrical motor assembly 400 may be referred to as control mechanisms.

In order to control the seat locking mechanism 80 manually, an occupant of the adjustable seat will activate a position control lever (not shown), which provides tension to the cable 104. The position control lever may be located in an arm (not shown) of the adjustable seat. As tension is applied to the cable 104, the cable 104 pulls on and releases the override bypass assembly 100, which rotates a carriage tube 210 of the carriage assembly 200. In the illustrated embodiment, the override bypass assembly 100 is located towards the aft end of the seat locking mechanism 80; however the override bypass assembly 100 may be located in other various locations. The carriage tube 210 is operably connected to an aft lateral brake 502 and a forward lateral brake 504 of the lateral brake assembly 500. As the carriage tube 210 rotates the lateral brake assembly 500 is unlocked, which allows the adjustable seat to move laterally along an aft track bar 550 and a forward track bar 560. The carriage assembly 200 is operably connected to the longitudinal brake assembly 600 through a longitudinal brake cable 220. As the carriage tube 210 rotates, tension is applied to the longitudinal brake cable 220, which releases the longitudinal brake assembly 600 and allows the adjustable seat to move longitudinally (forward and/or aft) along two longitudinal track bars 610. As will be appreciated by those of skill in the art, the structural support of the seat locking mechanism 80 may be composed of the longitudinal track bars 610, the aft track bar 550, and the forward track bar 560. The carriage assembly 200 is also operably connected to the rotational brake assembly 300 through a rotational brake cable 230. As the carriage tube 210 rotates, tension is applied to the rotational brake cable 230, which releases the rotational brake assembly 300 and allows the adjustable seat to rotate. Summarily, when tension is applied to the cable 104, the override bypass assembly 100 is released, which allows the carriage assembly 200 to rotate and unlock the lateral brake assembly 500, the longitudinal brake assembly 600, and the rotational brake assembly 300. The seat locking mechanism 80 may be seen in its unlocked position in FIG. 3.

Once the tension on the cable 104 is released, a biasing mechanism 116 will move the override bypass assembly 100 back to its locked position, which in turn rotates the carriage assembly 200 back to its locked position. With the carriage assembly 200 back in its locked position, the lateral brake assembly 500 is now locked and tension is relieved on both the longitudinal brake cable 220 and the rotational brake cable 230. The tension relief on the longitudinal brake cable 220 locks the longitudinal brake assembly 600. The tension relief on the rotational brake cable 230 allows a biasing mechanism 370 to move the rotational brake assembly 300 back to its locked position. The seat locking mechanism 80 may be seen in its locked position in FIG. 2.

The seat locking mechanism 80 may also be unlocked automatically utilizing the electric motor assembly 400, which operably connects to the carriage assembly 200 and rotates the carriages assembly 200 to unlock the lateral brake assembly 500, the longitudinal brake assembly 600, and the rotational brake assembly 300. The seat locking mechanism 80 may be seen in its unlocked position in FIG. 3. To lock the seat locking mechanism 80, the electric motor assembly 400 will rotate the carriage assembly 200 back to its locked position. With the carriage assembly 200 back in its locked position, the lateral brake assembly 500 is now locked and tension is relieved on both the longitudinal brake cable 220 and the rotational brake cable 230. The tension relief on the longitudinal brake cable 220 locks the longitudinal brake assembly 600. The tension relief on the rotational brake cable 230 allows a biasing mechanism 370 to move the rotational brake assembly 300 back to its locked position. The seat locking mechanism 80 may be seen in its locked position in FIG. 2.

Figure 6:
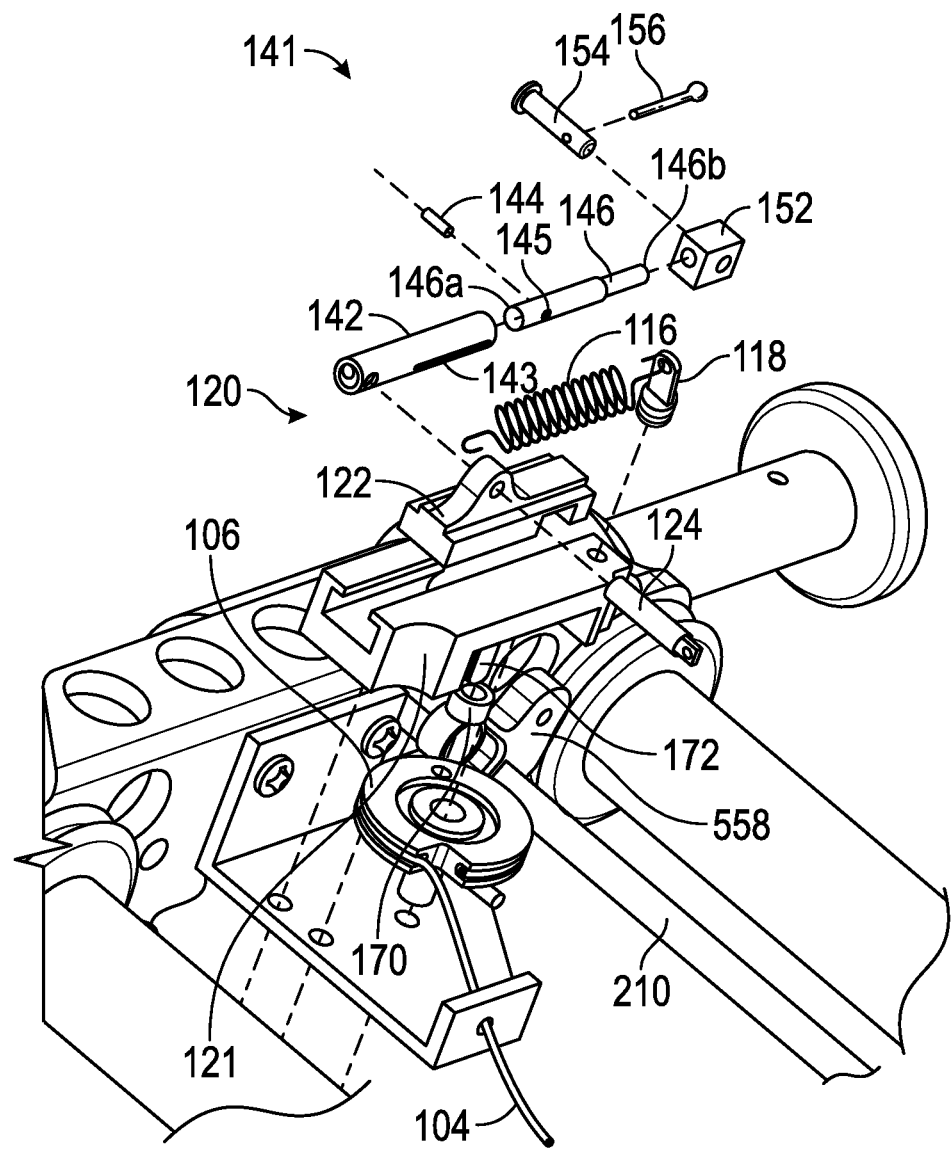
FIG. 6 is an exploded view of the override bypass assembly of FIGS. 4 & 5, according to embodiments of the present disclosure.

Referring now to FIGS. 4-6: FIG. 4 shows a schematic illustration of the override bypass assembly 100 of the seat locking mechanism in a locked position, according to embodiments of the present disclosure; FIG. 5 shows a schematic illustration of the override bypass assembly 100 of the seat locking mechanism in an unlocked position, according to embodiments of the present disclosure; FIG. 6 shows an exploded view of the override bypass assembly 100 of FIGS. 4 & 5, according to embodiments of the present disclosure. The override bypass assembly 100 includes a cable 104, a pulley wheel 106, a telescoping cylinder assembly 141, and a biasing mechanism 116. The cable 104 is operably connected to the pulley wheel 106. As tension is applied to the cable 104, the cable 104 rotates the pulley wheel 106. The pulley wheel 106 is operably connected to the telescoping cylinder assembly 141, such that as the pulley wheel 106 rotates, the telescoping cylinder assembly 141 linearly extends and then rotates an aft lateral brake lever 558 to unlock the aft lateral brake 502. The aft lateral brake 502 locks when the aft lateral brake lever 558 rotates an aft lateral lock pin 554 to engage with an aft slot 552 of the aft track bar 550, as seen in FIG. 4. The aft lateral brake 502 unlocks when the aft lateral brake lever 558 rotates an aft lateral lock pin 554 to disengage with an aft slot 552 of the aft track bar 550, as seen in FIG. 5.

The rotational motion of the pulley wheel 106 is translated to linear motion of the telescoping cylinder assembly 141 via a linear slide mechanism 120. In the illustrated embodiment, the linear slide mechanism 120 includes a slide housing 121, a bearing 170, a bearing pin 172, and a slide 122 operably connected to the telescoping cylinder assembly 141, as seen in FIG. 6. The bearing 170 is operably connected to the pulley wheel 106 via the bearing pin 172. The bearing 170 is also operably connected to the slide 122. As the pulley wheel 106 rotates, the bearing 170 moves the slide 122, along with the telescoping cylinder assembly 141, linearly relative to the slide housing 121. The slide 122 is operably connected to the telescoping cylinder assembly 141 via a cable anchor pin 124.

Once tension on the cable 104 is relieved, the biasing mechanism 116, operably connected to the telescoping cylinder assembly 141, will linearly move the telescoping cylinder assembly 141 back to its locked position and subsequently lock the aft lateral brake 502. In the illustrated embodiment, biasing mechanism 116 is connected to the slide 122 and the telescoping cylinder assembly 141 via the cable anchor pin 124. Also, as seen in the illustrated embodiment, the biasing mechanism 116 may be secured to the slide housing 121, via a biasing mechanism anchor pin 118. In an embodiment, the biasing mechanism 116 may be a spring.

In the illustrated embodiment, the telescoping cylinder assembly 141 includes a cylinder 142, a shaft 146, a cap 152 and a roll pin 144, as seen in FIG. 6. The shaft 146 includes a first end 146a located internal to the cylinder and a second end 146b fixedly connected to the cap 152. The roll pin 144 allows the shaft 146 to translate within the cylinder 142, while operably connecting the shaft 146 to the cylinder 142 at the first end 146a. The roll pin 144 may be located in a through hole 145 of the shaft 146 and operably connected to a slot 143 of the cylinder 142, as seen in FIG. 6. The roll pin 144 secures the shaft 146 to the cylinder 142, while allowing the shaft 146 to translated the length of the slot 143. The cap 152 is operably connected to the aft lateral brake lever 558 via a clevis pin 154. The clevis pin 154 may be secured in place by a cotter pin 156. As the aft lateral brake lever 558 rotates, the carriage tube 210 rotates as well.

Figure 7:
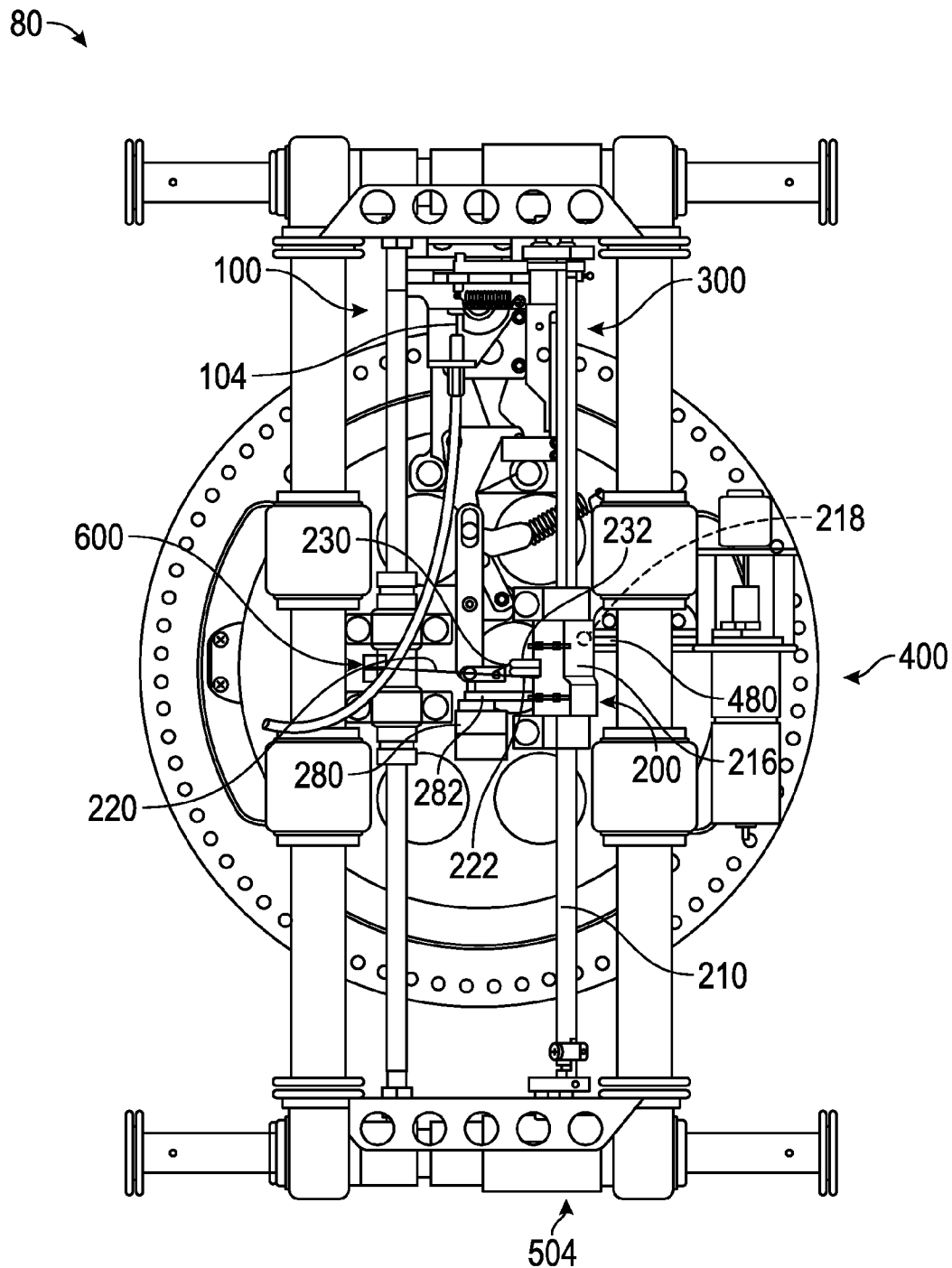
FIG. 7 is a schematic illustration of a carriage assembly, according to embodiments of the present disclosure.

Referring now FIG. 7, which shows a schematic illustration of a carriage assembly 200, according to embodiments of the present disclosure. The carriage assembly 200 includes a carriage housing 216 fixedly connected to the carriage tube 210, as seen in FIG. 7. The carriage housing 216 is operably connected to the rotational brake assembly 300 and the longitudinal brake assembly 600. The carriage housing 216 includes a rotational brake connecting point 232 and a longitudinal brake connecting point 222. The carriage housing 216 is operably connected to the rotational brake assembly 300 through the rotational brake cable 230, which connects to the carriage housing 216 at the rotational brake connecting point 232. The carriage housing 216 is operably connected to the longitudinal brake assembly 600 through the longitudinal brake cable 220, which connects to the carriage housing 216 at the longitudinal brake connecting point 222. The carriage housing 216 rotates as the carriage housing tube 210 rotates. As the carriage housing 216 rotates, it pulls on longitudinal brake cable 220 to unlock the longitudinal brake assembly 600, which allows the adjustable seat to move forward and aft. Simultaneously, as the carriage housing 216 rotates, it pulls the rotational brake cable 230 to unlock the rotational brake assembly 300, which allows the adjustable seat to rotate.

The carriage housing 216 may also be operably connected to the electric motor assembly 400 via a motor link 480. The motor link 480 connects to the carriage housing 216 at the motor connection point 218 located on the carriage housing 216. The carriage assembly 200 may also include a damper 280 operably connected to the carriage housing 216 through a damping link 282. The damper 280 dampens the motions of the electric motor assembly 400.

Figure 8:
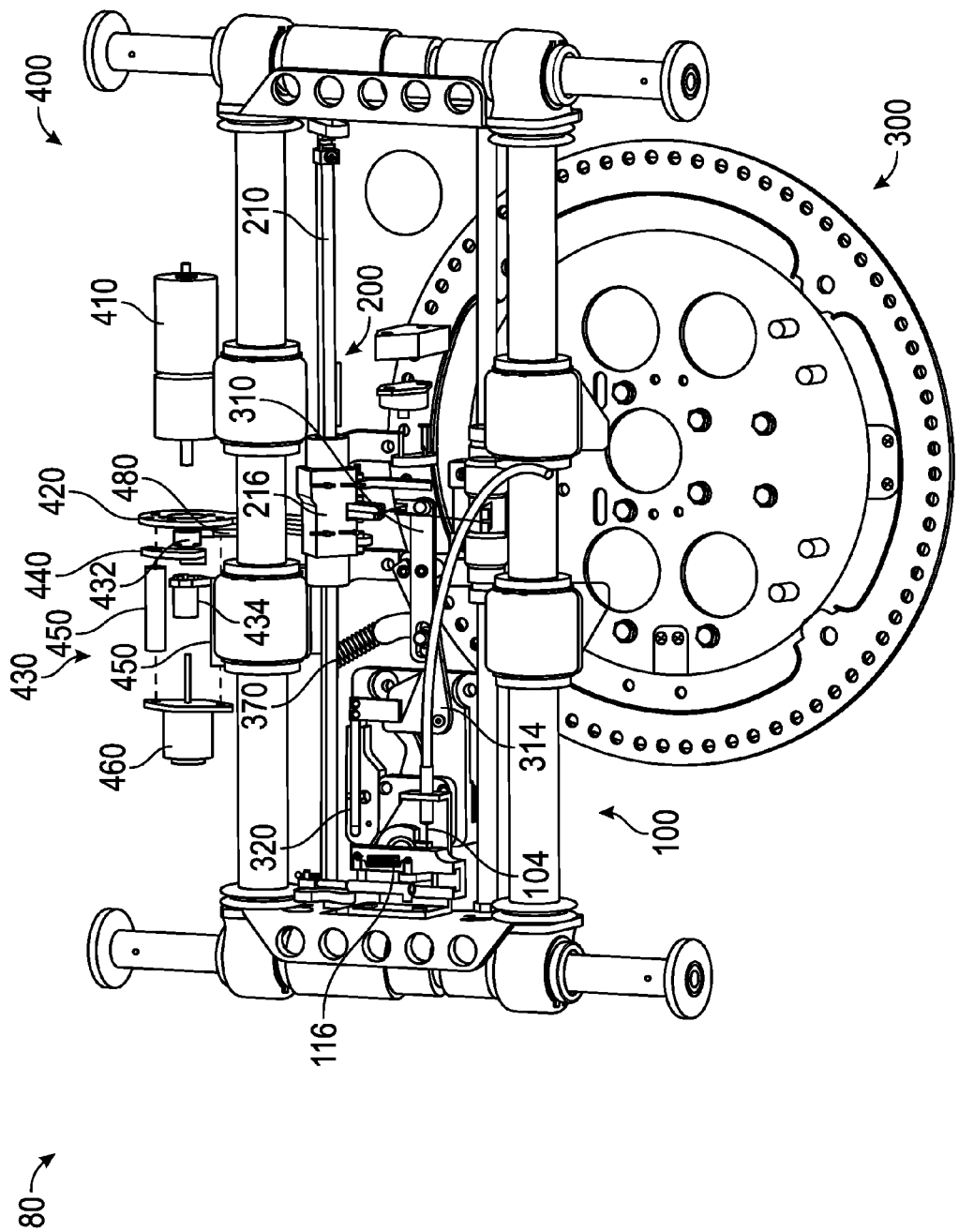
FIG. 8 is a schematic illustration of a rotational brake assembly and an electric motor assembly, according to embodiments of the present disclosure.
Figure 9:
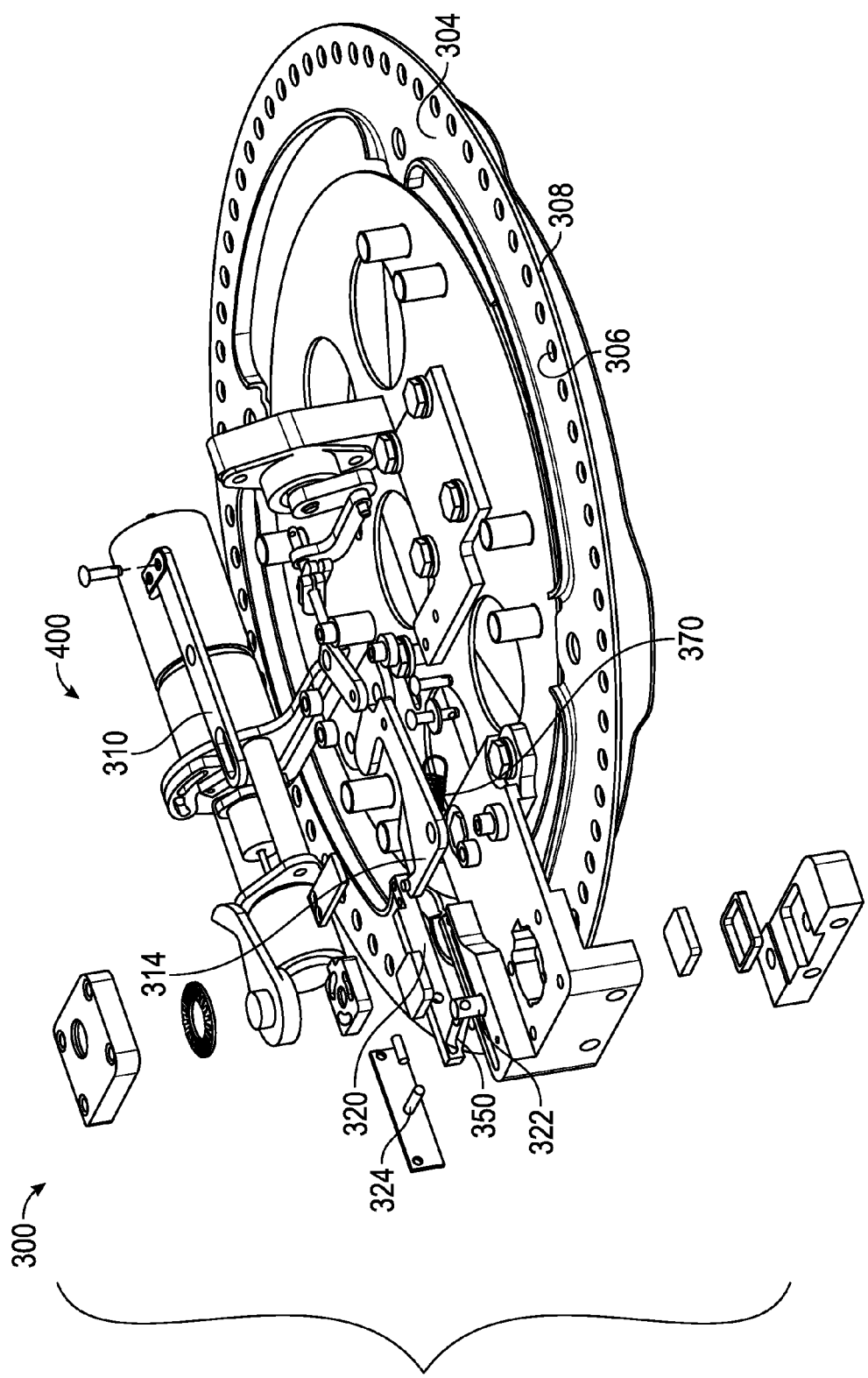
FIG. 9 is an exploded view of the rotational brake assembly of FIG. 8, according to embodiments of the present disclosure.

Referring now to FIGS. 8 and 9. FIG. 8 shows a schematic illustration of the rotational brake assembly 300 and the electric motor assembly 400, according to embodiments of the present disclosure. FIG. 9 shows an exploded view of the rotational brake assembly of FIG. 8, according to embodiments of the present disclosure. As seen in FIG. 9, the rotational brake assembly 300 includes a rotational brake pin 322, a lifting pin 324, a cam 320, a biasing mechanism 370 and a swivel disc 304 having a plurality of locking holes 306 proximate the outer diameter 308 of the swivel disc 304. The cam 320 includes angled slot 350, where the lifting pin 324 resides. The lifting pin 324 is operably connected to the rotational brake pin 322. As the cam 320 translates radially inward, the lifting pin 324 slides up the angled slot 350 along with the rotational brake pin 322. This motion lifts the rotational brake pin 322 out of a locking hole 306 and allows the adjustable seat to rotate. In the illustrated embodiment, the cam 320 is operably connected to the carriage housing 216 of the carriage assembly 200 through a series of linkages, including a control lever 314 and a link 310. The control lever 314 is operably connected to the cam 320 and the link is operably connected to the control lever 314. The carriage housing 216 is operably connected to the link 310 through the rotational brake cable 230. Once the tension is applied to the cable 104, the override bypass assembly 100 releases and rotates the carriage tube 210 along with the carriage housing 216, which pulls on the rotational brake cable 230 and subsequently moves the cam 320 radially inward to lift the rotational brake pin 322 out of the locking hole 306. If the seat locking mechanism 80 possesses an electric motor assembly 400, the electric motor assembly 400 will rotate the carriage housing 216, which pulls on the rotational brake cable 230 and subsequently moves the cam 320 radially inward to lift the rotational brake pin 322 out of the locking hole 306.

Once tension on the cable 104 is relieved and/or the electric motor assembly 400 moves the carriage housing 216 back to the locked position, the biasing mechanism 370 will move the cam 320 radially outward, thus allowing the lifting pin 324 to slide down in slot 350 and let the rotational brake pin 322 move back into a locking hole 306. In the illustrated embodiment, the biasing mechanism 370 is operably connected to the cam 320 through the control lever 314, as seen in FIG. 8.

The electric motor assembly 400 includes a drive motor 410, a drive motor link 480, a solenoid 460 operably connected to the drive motor 410 through a clutch system 430, as seen in FIG. 8. The clutch system includes a female gear 432 and a male gear 434. The electric motor assembly 400 is operably connected to the carriage housing 216 of the carriage assembly 200 through the drive motor link 480. When the electric motor assembly 400 is activated, the solenoid 460 moves the male gear 434 to engage with the female gear 432, thus allowing the drive motor 410 to move the drive motor link 480. Subsequently, the drive motor link 480 will rotate the carriage housing 216. When the electric motor assembly 400 is deactivated, the solenoid 460 moves the male gear 434 to disengage with the female gear 432 and the biasing mechanism 116 will move the move the override bypass assembly 100 back to its locked position. This motion subsequently rotates the carriage housing 216 back to its locked position, which allows the biasing mechanism 370 to move the rotational brake assembly 300 back to its locked position. The electric motor assembly 400 may include limit switch mount 440 for mounting a limit switch (not shown). The electric motor assembly 400 may also include spacers 450 to maintain separation between the solenoid 460 and the drive motor 410. As seen in FIG. 8, the electric motor assembly 400 includes a motor mount 420 to fixedly connect the electric motor assembly 400 to the seat locking mechanism 80.

Referring now to FIGS. 10 and 11. FIG. 10 shows a schematic illustration of a lateral brake assembly 500 in a locked position, according to embodiments of the present disclosure. FIG. 11 shows a schematic illustration of a lateral brake assembly 500 in an unlocked position, according to embodiments of the present disclosure. The lateral brake assembly 500 includes an aft lateral brake 502, a forward lateral brake 504, and a carriage tube 210 that connects the aft lateral brake 502 to the forward lateral brake 504. An aft end 212 of the carriage tube 210 operably connects to the aft lateral brake 502. A forward end 214 of the carriage tube 210 operably connects to the forward lateral brake 504. The aft lateral brake 502 includes an aft housing 530, an aft track bar 550 within the aft housing 530, an aft lateral lock pin 554, and an aft lateral brake lever 558. The aft track bar 550 includes a plurality of aft slots 552 for the aft lateral lock pin 554 to engage and/or disengage. The aft housing 530 may include bearings (not shown) to aid movement over the aft track bar 550 when the lateral brake assembly 500 is in the unlocked position, as seen in FIG. 11. The forward lateral brake 504 includes a forward housing 540, a forward track bar 560 within the forward housing 540, a forward lateral lock pin 564, and a forward lateral brake lever 568. The forward track bar 560 includes a plurality of forward slots 562 for the forward lateral lock pin 564 to engage and/or disengage. The forward housing 540 may include bearings (not shown) to aid movement over the forward track bar 560 when the lateral brake assembly 500 is in the unlocked position, as seen in FIG. 11.

The carriage tube 210 is operably connected to the aft lateral housing 530, such that the carriage tube 210 is free to rotate. The carriage tube 210 is fixedly connected to the aft lateral lock pin 554 through the aft lateral brake lever 558. As the carriage tube 210 rotates, the aft lateral lock pin 554 will engage (i.e. lock, as seen in FIG. 10) the plurality of aft slots 552 and/or disengage (i.e. unlock, as seen in FIG. 11) the plurality of aft slots 552. The carriage tube 210 is operably connected to the forward lateral housing 540, such that the carriage tube 210 is free to rotate. The carriage tube 210 is fixedly connected to the forward lateral lock pin 564 through the forward lateral brake lever 568. As the carriage tube 210 rotates, the forward lateral lock pin 564 will engage (i.e. lock, as seen in FIG. 10) the plurality of forward slots 562 and/or disengage (i.e. unlock, as seen in FIG. 11) the plurality of forward slots 562. The aft lateral lock pin 554 and the forward lateral lock pin 564 will engage and/or disengage simultaneously because their movement is tied together by the carriage tube 210. As described above, the carriage tube 210 may be rotated manually by the override bypass assembly 100 at the aft lateral brake lever 558 or automatically by the electric motor assembly 400.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:
1. A seat locking mechanism comprising:
a plurality of positional brake mechanisms including a longitudinal brake assembly, a lateral brake assembly, and a rotational brake assembly;
an electric motor assembly operably connected to each of the plurality of positional brake mechanisms, the electric motor assembly comprising:
a drive motor;
a clutch system located between the drive motor and the plurality of positional brake mechanisms; and
a solenoid operably connected to the clutch system, the solenoid in operation engages the clutch system to operably connect the electric motor to the plurality of positional brake mechanisms when the electric motor assembly is activated and disengages the clutch system to operably disconnect the electric motor to the plurality of positional brake mechanisms when the electric motor assembly is deactivated,
wherein the electric motor assembly in operation moves the plurality of positional brake mechanisms to at least one of a locked position when the electric motor assembly is activated and an unlocked position when the electrical motor assembly is deactivated.
2. The seat locking mechanism of claim 1, wherein the clutch system further comprises:

a male clutch and a female clutch, the male clutch in operation engages the female clutch when the electric motor assembly is activated and disengages the female clutch when the electric motor assembly is deactivated, wherein at least one of the male clutch and the female clutch is operably connected to the motor and the other is operably connected to the solenoid.

3. The seat locking mechanism of claim 1, further comprising:
a carriage assembly operably connecting the electric motor assembly to the plurality of positional brake mechanisms, wherein the carriage assembly in operation moves the plurality of positional brake mechanisms to at least one of the locked position when the electric motor assembly is activated and the unlocked position when the electrical motor assembly is deactivated.

4. The seat locking mechanism of claim 3, wherein:
the carriage assembly has a first end and a second end, the first end being operably connected to a first lateral brake of the lateral brake assembly and the second end being operably connected to a second lateral brake of the lateral brake assembly.

5. The seat locking mechanism of claim 3, wherein:
the carriage assembly is operably connected to the longitudinal brake assembly through a longitudinal brake cable.

6. The seat locking mechanism of claim 3, wherein:
the carriage assembly is operably connected to the rotational brake assembly through a rotational brake cable.

7. The seat locking mechanism of claim 1, further comprising:
a damper operably connected to the electric motor assembly, the damper in operation dampens the motion of the electric motor assembly.

8. A method of assembling a seat locking mechanism comprising:
installing a plurality of positional brake mechanisms onto a structural support, the plurality of positional brake mechanisms including a longitudinal brake assembly, a lateral brake assembly, and a rotational brake assembly;
installing an electric motor assembly onto the structural support;
operably connecting the electric motor assembly to each of the plurality of positional brake mechanisms, the electric motor assembly comprising:
a drive motor;
a clutch system located between the drive motor and the plurality of positional brake mechanisms; and
a solenoid operably connected to the clutch system, the solenoid in operation engages the clutch system to operably connect the electric motor to the plurality of positional brake mechanisms when the electric motor assembly is activated and disengages the clutch system to operably disconnect the electric motor to the plurality of positional brake mechanisms when the electric motor assembly is deactivated,
wherein the electric motor assembly in operation moves the plurality of positional brake mechanisms to at least one of a locked position when the electric motor assembly is activated and an unlocked position when the electrical motor assembly is deactivated.

9. The method of claim 8, wherein the clutch assembly further comprises:
a male clutch and a female clutch, the male clutch in operation engages the female clutch when the electric motor assembly is activated and disengages the female clutch when the electric motor assembly is deactivated, wherein at least one of the male clutch and the female clutch is operably connected to the motor and the other is operably connected to the solenoid.

10. The method of claim 8, further comprising:
operably connecting the electric motor assembly to the plurality of positional brake mechanisms through a carriage assembly, the carriage assembly in operation moves the plurality of positional brake mechanisms to at least one of the locked position when the electric motor assembly is activated and the unlocked position when the electrical motor assembly is deactivated.

11. The method of claim 10, further comprising:
operably connecting the carriage assembly to the lateral brake assembly, the carriage assembly having a first end and a second end, the first end being operably connected to a first lateral brake of the lateral brake assembly and the second end being operably connected to a second lateral brake of the lateral brake assembly.

12. The method of claim 11, further comprising:
operably connecting a damper to the electric motor assembly, the damper in operation dampens the motion of the electric motor assembly.

13. The method of claim 10, further comprising:
operably connecting the carriage assembly to the longitudinal brake assembly through a longitudinal brake cable.

14. The method of claim 10, further comprising:
operably connecting the carriage assembly to the rotational brake assembly through a rotational brake cable.

15. A method of operating a seat locking mechanism, the method comprising:
operating a plurality of positional brake mechanisms including a longitudinal brake assembly, a lateral brake assembly, and a rotational brake assembly, wherein operating includes moving each of the plurality of positional brake mechanisms to at least one of a locked position and an unlocked position;
controlling, using an electric motor assembly, each of the plurality of positional brake mechanisms, the electric motor assembly comprising: a drive motor;
a clutch system located between the drive motor and the plurality of positional brake mechanisms; and
a solenoid operably connected to the clutch system, the solenoid in operation engages the clutch system to operably connect the electric motor to the plurality of positional brake mechanisms when the electric motor assembly is activated and disengages the clutch system to operably disconnect the electric motor to the plurality of positional brake mechanisms when the electric motor assembly is deactivated,
wherein the electric motor assembly in operation moves the plurality of positional brake mechanisms to at least one of the locked position when the electric motor assembly is activated and the unlocked position when the electrical motor assembly is deactivated.

16. The method of claim 15, further comprising:
moving, using a plurality of biasing mechanisms, each of the plurality of positional brake mechanisms to the locked position, when the electric motor assembly is deactivated.

17. The method of claim 15, wherein the clutch system further comprises:
a male clutch and a female clutch, the male clutch in operation engages the female clutch when the electric motor assembly is activated and disengages the female clutch when the electric motor assembly is deactivated, wherein at least one of the male clutch and the female clutch is operably connected to the motor and the other is operably connected to the solenoid.

18. The method claim 15, further comprising:
moving, using a carriage assembly, each of the plurality of positional brake mechanisms, wherein the electric motor assembly is operably connected to each of the plurality of positional brake mechanisms through the carriage assembly.

19. The seat locking mechanism of claim 18, wherein:
the carriage assembly has a first end and a second end, the first end being operably connected to a first lateral brake of the lateral brake assembly and the second end being operably connected to a second lateral brake of the lateral brake assembly.

20. The seat locking mechanism of claim 18, wherein:
the carriage assembly is operably connected to the rotational brake assembly through a rotational brake cable.

* * * * *